United States Patent [19]
Katz et al.

[11] 3,991,353
[45] Nov. 9, 1976

[54] METHOD OF AND MOTOR APPARATUS FOR GENERATING HIGH SPEEDS

[75] Inventors: Leonhard Katz, Winchester; Lawrence A. Ormord, West Lynn, both of Mass.

[73] Assignee: Astro Dynamics, Inc., Burlington, Mass.

[22] Filed: Dec. 12, 1974

[21] Appl. No.: 531,923

[52] U.S. Cl. ............................ 318/227; 318/231; 321/60; 321/61; 321/69 R
[51] Int. Cl.² ..................................... H02P 5/40
[58] Field of Search ............ 318/227, 231; 321/60, 321/61, 69 R

[56] References Cited
UNITED STATES PATENTS

| | | |
|---|---|---|
| 3,624,472 | 11/1971 | Graham .......................... 318/227 |
| 3,684,935 | 8/1972 | Sawyer et al. .................. 318/231 X |
| 3,689,813 | 9/1972 | Sawyer et al. .................. 318/231 X |
| 3,832,624 | 8/1974 | Gilmore et al. ................ 321/69 R X |

*Primary Examiner*—Gene Z. Rubinson
*Attorney, Agent, or Firm*—Rines and Rines

[57] ABSTRACT

This disclosure deals with a motor technique for enabling the running at speeds higher than 3600 r.p.m., for 60 c.p.s. excitation, without the previously required commutators, brushes, gear boxes or frequency changers, through novel sequence switching of different selected portions of three-phase power, controlled to cause multiple magnetic pole energization at different times from different power phases in order to produce successive phase-displaced resultant waveforms that are substantially sinusoidal but of a multiple of 60 c.p.s.

24 Claims, 8 Drawing Figures

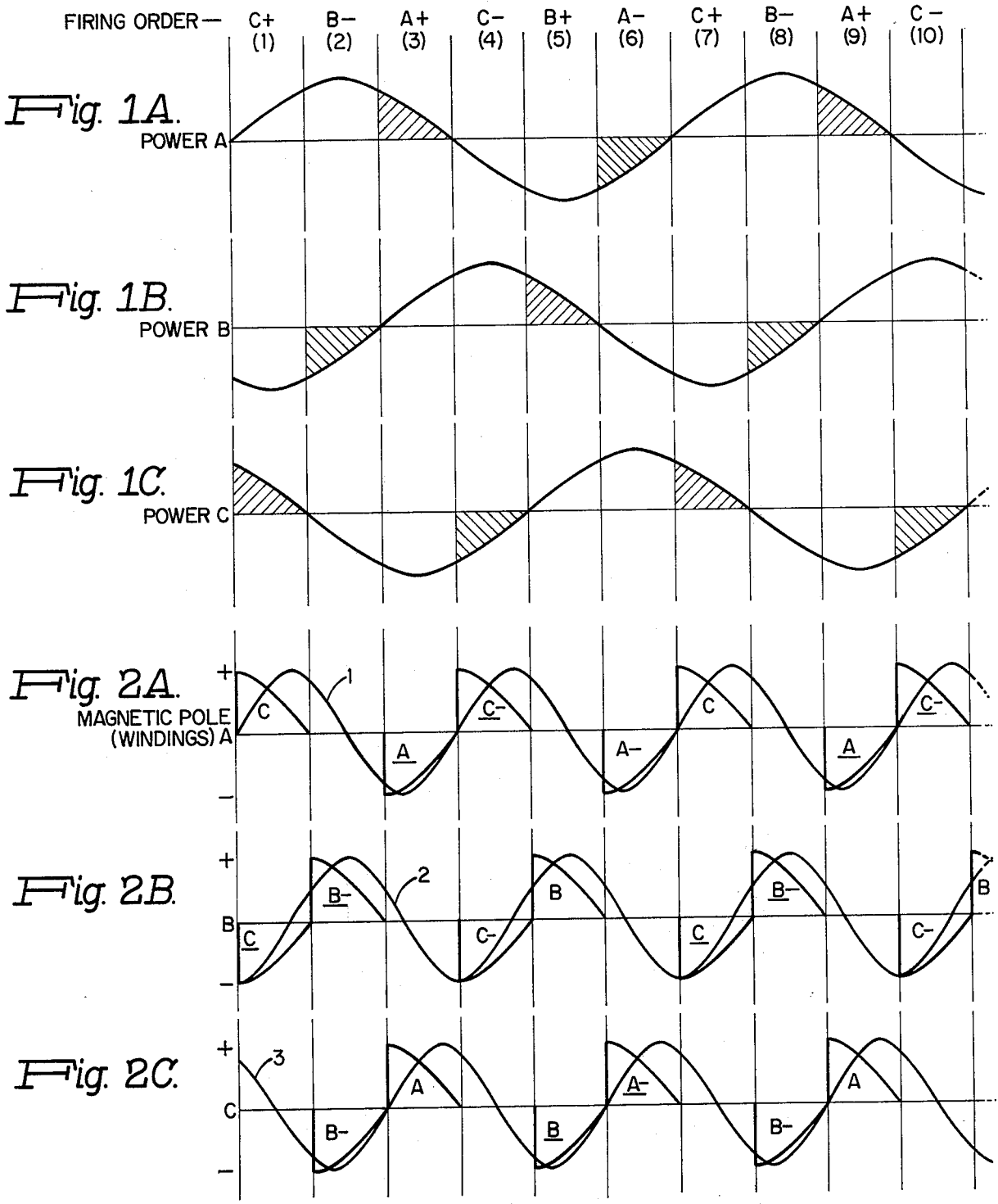

METHOD OF AND MOTOR APPARATUS FOR GENERATING HIGH SPEEDS

The present invention relates to novel methods of and motor apparatus for generating high speeds, being more particularly directed to producing a novel motor which can run off 60 cycles per second (c.p.s.) A.C. (or other frequency $f$) efficiently at speeds higher than 3600 revolutions per minute (r.p.m.), or generically $60f$, without commutators, brushes, gear boxes, or frequency changers.

For many years, there has been a great need for high speed motors which can run at speeds in excess of 3600 r.p.m., the so-called synchronous speed. Any source of electricity which uses 60 c.p.s. frequency, for example, can only produce motors which operate at 3600 r.p.m. or fractions thereof, such as 1800 r.p.m. (½ speed), 1200 r.p.m. (⅓ speed), 900 r.p.m. (¼ speed), etc. The slower speeds are obtained by introducing more poles; but higher speeds above 3600 r.p.m. cannot be obtained by this method.

Various attempts have been made to obtain higher shaft speeds to drive high speed devices. There are, however, only three general methods, as follows:

a. The use of a gear box or belted speed changer; but this, however, is inefficient, noisy, and the life is limited.

b. Use commutators and brushes. This is used on fractional horse power motors such as vacuum cleaners, home tools, etc. While it produces high speed, it generates a lot of sparking, and the life is short (100–500 hours).

c. Use a frequency changer. This uses a lot of cumbersome equipment, in which a conventional 3600 r.p.m. motor drives a high frequency generator to produce electric current at higher frequencies. As a result, a higher r.p.m. can be obtained. This can also be obtained electronically with costly equipment.

In accordance with the discovery underlying the present invention, however, higher speeds can be attained directly without any cumbersome devices that reduce the life of the motor. The motor of the invention, moreover, looks very similar to a conventional motor, except that it runs faster. The additional cost required for the result is minimal, particularly in the 1–20 horsepower region; and the additional cost per motor appears to be less than 10% per motor. As a result, high volume applications are feasible for these new high speed motors as air moving devices (fans and blowers), liquid moving devices (pumps), and special applications such as high speed extractors, dryers, drills, antipollution equipment, etc.

An electric motor produces a fixed amount of horsepower = torque × speed. A certain size motor may deliver, for example, 8 horsepower at 3600 r.p.m.; but the same size motor only delivers 4 horsepower at 1800 r.p.m. Conversely, if the motor could be run at 7200 r.p.m., it would produce 16 horsepower from the same frame, or 24 horsepower at 10,800 r.p.m. Since electric motors are essentially sold "by the pound," the weight of a motor is important, and the present invention provides much lighter equipment for the same horsepower delivered.

Many electric motors, furthermore, are used to drive fans, blowers, or pumps. Since the delivered horsepower of a fan, blower or pump increases as the cube or third power of speed, if a motor can be run at twice the speed, the horsepower delivered increases by 8 times. Similarly, at 3 times the speed, the horsepower delivered increases by a factor of 27. Smaller size fans, blowers and pumps or the like can thus be used to produce the same output. This, then, represents significant savings for combined high speed motors and fans, blowers, or pumps.

Still an additional feature of the present invention, which makes it very attractive, is the ability to control the speed. At very small additional cost, it is possible to provide a speed control which can vary the speed of the motor over a wide range.

An object of the present invention, accordingly, is to provide a new and improved method of and motor apparatus for generating high motor speeds, such as multiples of power-synchronous speeds; for example, substantially twice the 3600 r.p.m. present limit of 60 cycle motors (it being understood that, for purposes of this invention, the same advantages are obviously attained with 50 cycle and other power frequencies).

A further object is to provide a novel motor of more general application, as well; other and further objects being pointed out hereinafter, and more particularly delineated in the appended claims.

In summary, from one of its viewpoints, the invention involves a method of generating motor speeds in revolutions per minute in excess of substantially $60f$ from a three-phase power source of frequency $f$ in cycles per second having displaced phases, that comprises, applying the three phases of power to correspondingly geometrically displaced terminals of three magnetic poles; selecting portions of the half-cycles of each power phase for energizing the magnetic poles; switching the power phases applied to each of said terminals in accordance with such selecting to energize the corresponding magnetic poles from said selected portions of a plurality of said power phases; and controlling the sequence of said switching to cause each of the said magnetic poles to be energized at different times during said half-cycles than the other poles by energy from different power phases in order to produce successively phase-displaced resultant waveforms that are substantially sinusoidal and of frequency substantially a multiple of said $f$. Preferred details are hereinafter presented.

The invention will now be described with reference to the accompanying drawings, FIGS. 1A, 1B and 1C of which are wave-form graphs illustrating operational portions of three-phase power used in accordance with a preferred embodiment of the invention;

FIGS. 2A, 2B and 2C are current-excitation wave forms at each of three magnetic poles of the motor of the invention;

Figure 3:
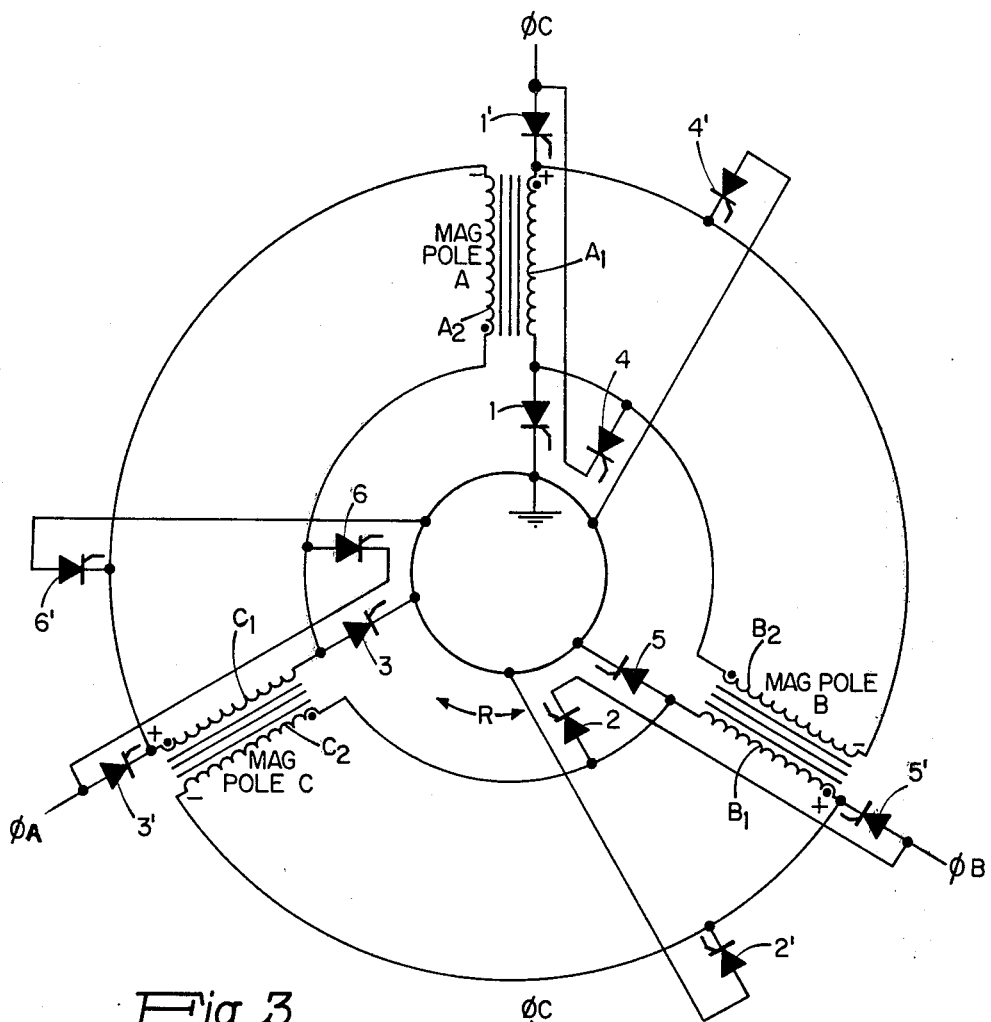
FIG. 3 is a schematic circuit diagram of a motor constructed to operate in accordance with the invention.

By means of electronic gates such as SCRs, which are triggered to conduct or turn on at particular time instants, as is well known, portions of each phase, preferably during the last portion of its half-period, are used, with the phase again extinguished when the voltage crosses the axis to zero. One of the reasons for the preferred use of, for example, the last substantially 60° in each half-cycle resides in the fact that while SCRs are easy to turn on, they can only be turned off by zero current and zero voltage. Consequently, if the SCR is turned on at substantially 120° from zero, it will turn off at 180° as the voltage wave goes through zero. Similarly, the SCR is turned on during the negative cycle at substantially 300°, and turned off at 360° when the zero axis is again crossed. The same operation occurs in all other phases, except the respective phases are displaced by 120°.

The first concern of the invention, accordingly, is with making a device which turns on a series of SCRs at the desired point, say substantially 60° before the zero axis crossing, and with the SCRs automatically turned off as the voltage crosses the axis. A further concern involves the nature of the motor magnetic poles in a three-phase motor, shown as wound bifilar in FIG. 3, such that there are actually two windings around each pole A, B and C. In this embodiment, as later explained, a first winding around each pole is used to pass the current from one particular phase and the other winding is used to pass the current from another phase. It is important to differentiate between the voltage or current-wave shapes in the three power phases (FIGS. 1A, 1B and 1C), and the actual currents which occur in the magnetic poles (FIGS. 2A, 2B and 2C).

In order for each magnetic pole to operate properly, it is necessary that it alternately receive a positive current and a negative current. In FIG. 2A, representing the energizing current pulses applied to magnetic pole A, it can be observed that the positive winding $A_1$ of the magnetic pole A obtains its power from the C phase ($\phi_C$, FIG. 1C), whereas the negative magnetic winding $A_2$ of the magnetic pole A obtains its power from the A phase ($\phi_A$, FIG. 1A). The actual connection of the windings $A_1$ and $A_2$ of the magnetic pole A is shown alternately by plus and minus signs, and with underlining of each letter denoting whether the winding has its polarity reversed or not.

Turning to FIG. 2B, the two phases which power magnetic pole B and its windings $B_1$ and $B_2$ are phases B ($\phi_B$, FIG. 1B) and C ($\phi_C$, FIG. 1C). In FIG. 2C it will be observed that the two phases which power magnetic pole C and its windings $C_1$ and $C_2$, are phases A ($\phi_A$, FIG. 1A) and B ($\phi_B$, FIG. 1B). Consequently, the individual magnetic poles share a different combination of excitation phases to produce the 120 cycle per second electric currents in this embodiment.

In this particular frequency doubling example of the invention, two phases are actually used, such that there appears a 60° gap in each of the energization current or voltage forms of FIGS. 2A, 2B and 2C, such that these gaps are at different time intervals. Where three phases are used, as in obtaining a tripling of the potential highest frequency, such gaps would not exist.

Specifically, in the energizing voltage or current waveforms of FIG. 2A for the magnetic pole A, there is a 60° gap between the first and third 60° portions of the first half-cycle; and this same intermediate 60° gap occurs in each of the successive half cycles. In the waveform of FIG. 2B, taking place at the magnetic pole windings B, the 60° gap is in the last 60° of the half cycle; whereas in the waveform of FIG. 2C, it is the first 60° of each half cycle of the third phase that is missing in the energization waveform.

In order to make a magnetic pole in a motor operate successfully, it must, of course, alternately energize positively and negatively. Consequently, the power phases and windings have been selected as above shown in FIGS. 1 and 2, in such a way that each individual magnetic pole is alternately energized positively and negatively—but, at a faster rate than the standard frequency entering on the three phases. One of the reasons why this configuration has apparently escaped previous workers in this art is the almost axiomatic rules that have been set in the use of three-phase power which state that two power phases must not be connected to the same load at the same time, since they are differing in phase. Examining the diagrams of FIGS. 2A, 2B and 2C, however, will show that this rule has, however, been maintained. At no time are two phases of power applied to the same magnetic pole. For example, power phases A and C, which are connected to magnetic pole A, are turned on alternately, and theoretically do not interfere with each other. Similar comments apply to the other phase excitations. Because of large inductances and cross couplings which do exist in practical magnetic circuit motors, however, such an ideal situation is not always realized in practice; and it is quite often possible that even though power is turned off at a particular point, the current in the pole still continues to run due to the large inductance of the circuit. As a result, opposing or circulating currents may be generated when the next phase is turned on since the current quite often lags the voltage. This may be compensated for by corrections in the precise firing point of the different SCRs.

The actual embodiment of the invention shown in FIG. 3 was constructed and successfully operated as a high-speed motor using the following components and design: Westinghouse AC Motor, Aircraft Type, Model A 46 A6406–3, Serial OF3435, initially designed to operate at 11,500 r.p.m. from a power source of 400 cycles per second; three-phase, 208/120 volts Y-connected, average 60-cycle current of 7.8 amps, with a power output of 1.5 horsepower. The motor was designed for continuous duty with a stall torque of 90 ounce feet and had 36 slots. The motor, as received, was tested for proper operation from a 400-cycle power supply and thereafter was rewound bifilarly, as indicated in FIG. 3. The winding $A_2$ of the magnetic pole A, FIG. 3, is powered by four SCRs marked 3, 3' and 6, 6'. These are connected to the phase A terminal ($\phi_A$) such that the SCRs 3, 3' are turned on during the A+ firing order of power phase A at timing sequence 3 indicated at the top of FIG. 1A. The SCRs 6, 6' are turned on during the A− portion of the phase at time sequence 6 indicated at the top of FIG. 1A. Each of the reference numbers applied to the SCRs in FIG. 3 denotes the particular firing order at which the SCR is rendered conducting.

Thus, parallel-circuit interconnected windings $C_1$ of pole C and $A_2$ of magnetic pole A, are powered by $\phi_A$ during a portion of the cycle through the configuration of SCRs 3, 3' and 6, 6'. The other winding $A_1$ of magnetic pole A is energized through power phase $\phi_C$, and is interconnected in a parallelling circuit to the winding $B_2$ on magnetic pole B. These two windings $A_1$ and $B_2$ together are powered by the four SCRs marked 1, 1' and 4, 4'. Consequently, the magnetic pole A is alternately powered through phase $\phi_A$ and through phase $\phi_C$. Magnetic pole B is alternately powered through phases $\phi_C$ and $\phi_B$. The third magnetic pole C is powered alternately through power phases $\phi_A$ and $\phi_B$.

The motor is wound as a two-pole, three-phase motor in which each pole is rotated 120° in space phase, and the rotor is schematically shown at R. It should be understood that the diagram shown, however, is a pictorial representation only, and that each magnetic pole actually contains a pair of segments 180° apart (not shown).

The configuration of FIG. 3 operates in accordance with specific waveforms of FIGS. 2A, 2B and 2C. In actual operation, substantially the envelopes shown at 1, 2 and 3, respectively in FIGS. 2A, 2B and 2C were produced, demonstrating the surprising result of a substantial doubling of the previously conventional maximum 3600 revolutions per minute that had been thought to be the upper limit of motor operation in the prior art. In actual practice, the resultant wave-forms 1, 2 and 3 deviated somewhat from precise sinusoidal shape, though they were sufficiently close to enable highly satisfactory operation. The reason, indeed, that the envelope contains the more gradual rising substantially sinusoidal segments as, for example, on the rising portion commencing at the left-hand end of FIG. 2A, appears to reside in the inertia of the inductance when the steep current or voltage wave-form labeled C is applied. Waveform diagrams attained, however, are surprisingly close to sinusoidal.

Figure 4:
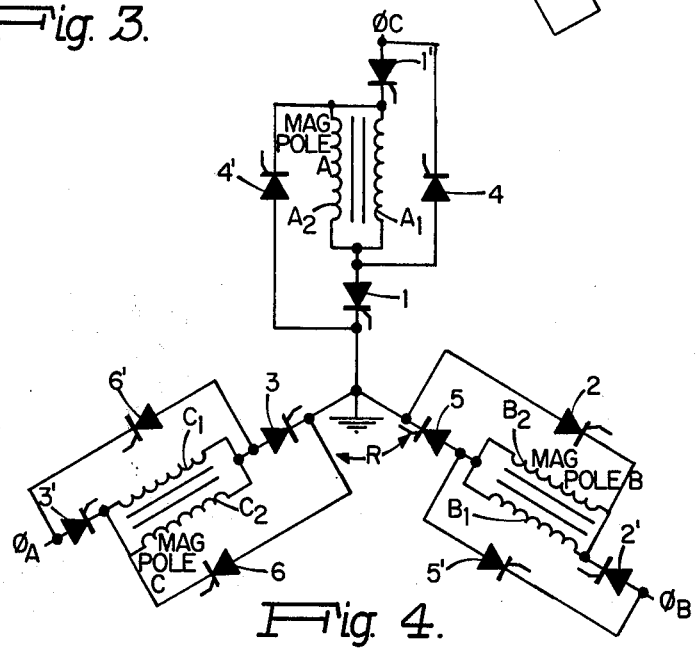
FIG. 4 is a similar diagram of a modification.

It has further been discovered that portions of the half-cycle energization may be produced by induction effects, apparently in cooperation with the rotor, schematically shown at R, replacing the circuits interconnecting a winding of each of the pair of windings with the other winding of the adjacent pair (as in FIG. 3) by circuits that connect the pairs of windings in parallel, as shown in FIG. 4, or, indeed replacing such pairs by appropriate single windings.

The power diagrams of FIGS. 1A, 1B and 1C are still applicable, but instead of the negative portion pulses $\underline{A}$, A–, $\underline{A}$ of FIG. 2A, $\underline{C}$, C–, $\underline{C}$ of FIG. 2B, and B–, $\underline{B}$, B– of FIG. 2 C being produced from another phase by the interconnecting circuits between adjacent pairs of windings, these are apparently produced by induction in the operation.

Referring, for example, to magnetic pole A, connected to phase $\phi_C$, at the second shaded portion of FIG. 1C, representing the last 60° portion of the negative half-cycle, SCR gates 4, 4' are pulsed on as current flows from ground through the left-hand SCR 4' through the windings $A_1$ and $A_2$ in parallel (or a single appropriate winding), then through SCR 4 to the phase terminal $\phi_C$. This generates the current pulse in the windings illustrate as C– in FIG. 2A. 180° later in FIG. 1C, at the next positive shaded 60° position at the end of the next positive half-cycle, SCR gates 1 and 1' are turned on with current now flowing from the terminal $\phi_C$ through SCR1', through the winding(s) $A_1$–$A_2$, through SCR1 to ground, generating the positive current pulse C in FIG. 2A in the same direction as $\underline{C-}$. This is effectively producing excitation of the windings at twice the synchronous (60 cycle) frequency of the incoming power by electronically effectively reversing the windings.

The same operation occurs 60° later at magnetic pole B (FIG. 2B) and 60° later on, at magnetic pole C (FIG. 2C).

In the previous embodiment of FIG. 3, it was necessary to provide a negative pulse in each pole such as portions $\underline{A}$, A– in FIG. 2A, $\underline{C}$, C– in FIG. 2B and B–, $\underline{B}$ in FIG. 2C. It has been found that it is not necessary to provide such negative pulses in each pole by interconnecting circuits, as in FIG. 3, but that such negative pulses can be inherently generated with the system of FIG. 4, apparently by internal induction, which phrase is intended generically to embrace the development of currents within the system. With such operation, indeed, improved operation over the system of FIG. 3 has been obtained in somewhat higher speeds and efficiency.

While preferred three-phase operation and the use of two phases is illustrated, the principles of the invention may be applied to less and more phases, with further modifications also occurring to those skilled in this art, and all such being considered to fall within the spirit and scope of the invention as defined in the appended claims.

What is claimed is:

1. A method of generating motor speeds in revolutions per minute in excess of substantially $60f$ from a three-phase power source of frequency $f$ in cycles per second having displaced phases, that comprises, applying the three phases of power to correspondingly geometrically displaced terminals of three magnetic poles; selecting portions of the half-cycles of each power phase for energizing the magnetic poles; switching the power phases applied to each of said terminals in accordance with such selecting to energize the corresponding magnetic poles from said selected portions of a plurality of said power phases; and controlling the sequence of said switching to cause each of the said magnetic poles to be energized at different times during said half-cycles than the other poles by energy from different power phases in order to produce successively phase-displaced resultant waveforms that are substantially sinusoidal and of frequency substantially a multiple of said $f$.

2. A method as claimed in claim 1 and in which the phase displacement is substantially 120°, and the selected portions of one of said power phases is the last portion of said half-cycle to the zero-crossing region.

3. A method as claimed in claim 2 and in which said last portion is substantially the last 60° of the half-cycle.

4. A method as claimed in claim 3 and in which the sequence of switching effects energizing with a contiguous pair of opposite-polarity substantially 60° portions, and with no energizing during substantially 60° portions between successive pairs.

5. A method as claimed in claim 4 and in which the successive 60° sequence of energizing of the three magnetic poles from the three power phases A, B and C of polarity + and − is selected substantially as follows:

| Sequence of Switching: | 1 | 2 | 3 | 4 | 5 | 6 |
|---|---|---|---|---|---|---|
| First Magnetic Pole {+ | | C+ | | | C− | |
| First Magnetic Pole {− | | | | $\underline{A+}$ | A− | |
| Second Magnetic Pole {+ | | | B− | | B+ | |
| Second Magnetic Pole {− | | $\underline{C+}$ | | | C− | |
| Third Magnetic Pole {+ | | | | A+ | | $\underline{A-}$ |
| Third Magnetic Pole {− | | B− | | | B+ | | where the underlining of A, B and C represents reverse pole polarity.

6. A method as claimed in claim 4 and in which said multiple is substantially 2.

7. A method as claimed in claim 1 and in which at any selected portion of energizing, only one power phase is applied to the poles.

8. A method as claimed in claim 1 and in which one polarity of energizing is effected directly by said switching, and the opposite polarity is effected by induction.

9. A method as claimed in claim 8 and in which the said one polarity is selected as positive.

10. A method as claimed in claim 8 and in which the successive sequence of energizing of the three magnetic poles from the three power phases A, B and C of polarity + and − is selected substantially as follows:

| Sequence of Switching: | 1 | 2 | 3 | 4 | 5 | 6 |
|---|---|---|---|---|---|---|
| First Magnetic Pole Direct Pulsing { | + | C+ | | C− | | |
| Induced Pulsing | − | | A+ | | | A− |
| Second Magnetic Pole Direct Pulsing { | + | B− | | | B+ | |
| Induced Pulsing | − | C+ | | C− | | |
| Third Magnetic Pole Direct Pulsing { | + | | A+ | | | A− |
| Induced Pulsing | − | | B− | | B+ | | where the underlining of A, B and C represents reverse pole polarity.

11. A method as claimed in claim 8 and in which said multiple is substantially 2.

12. A motor apparatus for generating speeds in revolutions per minute in excess of $60f$ from a three-phase power source of displaced phases of frequency $f$ in cycles per second, having in combination, three geometrically spaced magnetic pole winding means having respective terminals connected with each of the three phases of the power source; a plurality of switching means for controlling the energizing of the winding means from the corresponding power source phases at selected portions of the half-cycles of each power phase; and means for sequencing the switching means to energize each of the winding means from a plurality of the power source phases at different times during said half cycles of the phases than the other winding means, and by energy from different power phases, in order to produce successively phase-displaced resultant waveforms in each of the winding means that are substantially sinusoidal and of frequency substantially a multiple of said $f$.

13. A motor apparatus as claimed in claim 12 and in which the sequencing and switching means directly energizes the winding means in one polarity only, and opposite polarity energizing is effected by induction.

14. A motor apparatus as claimed in claim 12 and in which the sequencing and switching means directly energizes the winding means alternately in opposite polarities.

15. A motor apparatus as claimed in claim 14 and in which each magnetic pole winding means comprises bifilar winding means, with one winding of each of the bifilar winding means connected in one of the said interconnecting circuit means in parallel with a winding of the next bifilar winding means.

16. A motor apparatus as claimed in claim 15 and in which the windings of each bifilar winding means are of opposite poling, and said switching means comprises SCR bridge circuit means connected with said winding means terminals and said interconnecting means.

17. A motor apparatus as claimed in claim 16 and in which each SCR bridge circuit comprises a first SCR switch connected from the corresponding power source phase to a terminal of one of the windings of the corresponding bifilar winding means, a second SCR switch connected from the opposite terminal of said one of the bifilar windings to ground, and third and fourth SCR switches connecting opposite sides of the corresponding interconnecting circuit means to ground and to said power source phase.

18. A motor apparatus as claimed in claim 12 and in which the phase displacement of the power source phase is substantially 120° and the selected portions of the half-cycles of each power phase are adjusted to be the last portion to the zero-crossing region.

19. A motor apparatus as claimed in claim 18 and in which said last portion is substantially the last 60° of the half-cycle.

20. A motor apparatus as claimed in claim 19 and in which means is provided for controlling the switching means to energize a contiguous pair of opposite-polarity substantially 60° portions, and with no energizing during substantially 60° portions between successive pairs.

21. A motor apparatus as claimed in claim 20 and in which means is provided for controlling the said switching means to produce successive substantially 60° sequence of energizing of the three magnetic pole winding means from the said three power phases A, B and C of polarity + and −, substantially as follows:

| Sequence of Switchings: | 1 | 2 | 3 | 4 | 5 | 6 |
|---|---|---|---|---|---|---|
| First Magnetic Pole { | + | C+ | | C− | | |
| | − | | A+ | | | A− |
| Second Magnetic Pole { | + | B− | | | B+ | |
| | − | C+ | | C− | | |
| Third Magnetic Pole { | + | | A+ | | | A− |
| | − | | B− | | B+ | | where the underlining of A, B and C represents reverse windings polarity.

22. A motor apparatus as claimed in claim 12 and in which said sequencing means is adjusted to produce a multiple of substantially 2.

23. A motor apparatus as claimed in claim 12 and in which said sequencing means is adjusted such that at any selected portion of energizing of the winding means, only one power phase is applied to the winding means.

24. A method of generating motor speeds in revolutions per minute in excess of substantially $60f$ from a power source of frequency $f$ in cycles per second, that comprises, applying the power to geometrically displaced terminals of a plurality of magnetic poles; selecting portions of the cycle of the power for energizing the magnetic poles; switching the power applied to each of said terminals in accordance with such selecting to energize the corresponding magnetic poles from said selected portions of the cycles of said power; and controlling the sequence of said switching to cause each of the said magnetic poles to be energized at a different time during said cycle than another pole by energy from said selected portions in order to produce an effective excitation field having a resultant waveform that is substantially sinusoidal and of frequency substantially a multiple of said $f$.

* * * * *